US011213852B2

(12) United States Patent
Satoh et al.

(10) Patent No.: US 11,213,852 B2
(45) Date of Patent: Jan. 4, 2022

(54) PHOTOCATALYST LAYER, PHOTOCATALYST, AND METHOD FOR MANUFACTURING PHOTOCATALYST

(71) Applicant: SHARP KABUSHIKI KAISHA, Sakai (JP)

(72) Inventors: Takeshi Satoh, Sakai (JP); Yoshitaka Kawase, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 178 days.

(21) Appl. No.: 16/373,342

(22) Filed: Apr. 2, 2019

(65) Prior Publication Data

US 2019/0329288 A1  Oct. 31, 2019

(30) Foreign Application Priority Data

Apr. 26, 2018  (JP) .............................. JP2018-085364

(51) Int. Cl.

| | |
|---|---|
| *B05D 3/06* | (2006.01) |
| *B01J 35/00* | (2006.01) |
| *B01J 35/02* | (2006.01) |
| *B01J 23/652* | (2006.01) |
| *B01J 23/50* | (2006.01) |
| *B01J 23/85* | (2006.01) |
| *B01J 37/02* | (2006.01) |
| *B05D 7/24* | (2006.01) |
| *B01J 37/00* | (2006.01) |
| *B01J 23/30* | (2006.01) |
| *B05D 5/06* | (2006.01) |
| *B05D 3/14* | (2006.01) |

(52) U.S. Cl.
CPC .............. *B05D 3/065* (2013.01); *B01J 23/30* (2013.01); *B01J 23/50* (2013.01); *B01J 23/6527* (2013.01); *B01J 23/85* (2013.01); *B01J 35/004* (2013.01); *B01J 35/023* (2013.01); *B01J 37/0072* (2013.01); *B01J 37/0219* (2013.01); *B05D 3/148* (2013.01); *B05D 5/06* (2013.01); *B05D 7/24* (2013.01); *B01J 2523/17* (2013.01); *B01J 2523/18* (2013.01); *B01J 2523/69* (2013.01); *B01J 2523/828* (2013.01)

(58) Field of Classification Search
CPC .......... B05D 3/065; B05D 3/148; B05D 5/06; B05D 7/24; B01J 23/30; B01J 23/50; B01J 23/6527; B01J 23/85; B01J 35/004; B01J 35/023; B01J 37/0072; B01J 37/0219
See application file for complete search history.

(56) References Cited

U.S. PATENT DOCUMENTS 6,238,630 B1 * 5/2001 Iimura .................... B01J 19/123
422/121
2014/0135209 A1 * 5/2014 Kaburagi ........... B01D 53/8668
502/318

FOREIGN PATENT DOCUMENTS

JP  2005-205378 A  8/2005

* cited by examiner

*Primary Examiner* — James A Fiorito
(74) *Attorney, Agent, or Firm* — ScienBiziP, P.C.

(57) ABSTRACT

Provided is a photocatalyst layer that improves the photocatalytic performance while suppressing detachment of photocatalyst particles. The photocatalyst layer has a front surface and a rear surface on the opposite side of the front surface. The photocatalyst layer includes photocatalyst particles and a binder. The photocatalyst layer has a first region containing the photocatalyst particles and a second region containing the binder and not containing the photocatalyst particles. The photocatalyst particles include tungsten oxide particles. The photocatalyst particles have contact points being in contact with the rear surface. The ratio of the thickness of the second region to the number-average secondary particle diameter of the photocatalyst particles is 0.20 or more and 0.80 or less.

6 Claims, 7 Drawing Sheets

PHOTOCATALYST LAYER, PHOTOCATALYST, AND METHOD FOR MANUFACTURING PHOTOCATALYST

BACKGROUND

1. Field

The present disclosure relates to a photocatalyst layer, a photocatalyst, and a method for manufacturing a photocatalyst.

2. Description of the Related Art

Photocatalyst particles exhibit photocatalysis by being irradiated with light. In order to obtain effective photocatalysis, in the method for manufacturing a functional particle carrier described in Japanese Unexamined Patent Application Publication No. 2005-205378 (PTL 1), a binder layer is formed on a surface of a substrate, and functional particles, such as photocatalyst particles, are then printed or transferred on the surface of the binder layer.

However, it has been revealed by the study conducted by the present inventor that in the functional particle carrier manufactured by the method described in PTL 1, since the functional particles and the binder layer are adhered to each other by points, the adhesion strength of the functional particles to the binder layer is low, and the functional particles tend to detach from the binder layer.

SUMMARY

The present disclosure has been made in view of the above problems and provides a photocatalyst layer that improves the photocatalytic performance while suppressing detachment of photocatalyst particles. The present disclosure also provides a photocatalyst that improves the photocatalytic performance while suppressing detachment of photocatalyst particles. The present disclosure further provides a method for manufacturing a photocatalyst that improves the photocatalytic performance while suppressing detachment of photocatalyst particles.

The photocatalyst layer of the present disclosure has a front surface and a rear surface on the opposite side of the front surface. The photocatalyst layer includes photocatalyst particles and a binder. The photocatalyst layer has a first region containing the photocatalyst particles and a second region containing the binder and not containing the photocatalyst particles. The photocatalyst particles include tungsten oxide particles. The photocatalyst particles have contact points being in contact with the rear surface. The ratio of the thickness T of the second region to the number-average secondary particle diameter L of the photocatalyst particles, T/L, is 0.20 or more and 0.80 or less.

The photocatalyst of the present disclosure includes a substrate and a photocatalyst layer provided on the substrate. The photocatalyst layer is the photocatalyst layer described above.

The method for manufacturing a photocatalyst of the present disclosure includes a primary grinding process, a secondary grinding process, and a photocatalyst layer-forming process. In the primary grinding process, photocatalyst particles are primarily ground in liquid, and at least part of the liquid is then removed to give agglomerates of the photocatalyst particles. In the secondary grinding process, the agglomerates are secondarily ground in gas to adjust the number-average secondary particle diameter L of the photocatalyst particles. In the photocatalyst layer-forming process, a paint containing the photocatalyst particles and a binder is applied onto a substrate and is dried to form a photocatalyst layer on the substrate. The photocatalyst layer has a front surface and a rear surface on the opposite side of the front surface. The rear surface is the surface on the substrate side. The photocatalyst layer includes the photocatalyst particles and the binder. The photocatalyst layer has a first region containing the photocatalyst particles and a second region containing the binder and not containing the photocatalyst particles. The photocatalyst particles include tungsten oxide particles. The photocatalyst particles have contact points being in contact with the rear surface. The ratio of the thickness T of the second region to the number-average secondary particle diameter L of the photocatalyst particles, T/L, is 0.20 or more and 0.80 or less.

DESCRIPTION OF THE EMBODIMENTS

Figure 1:
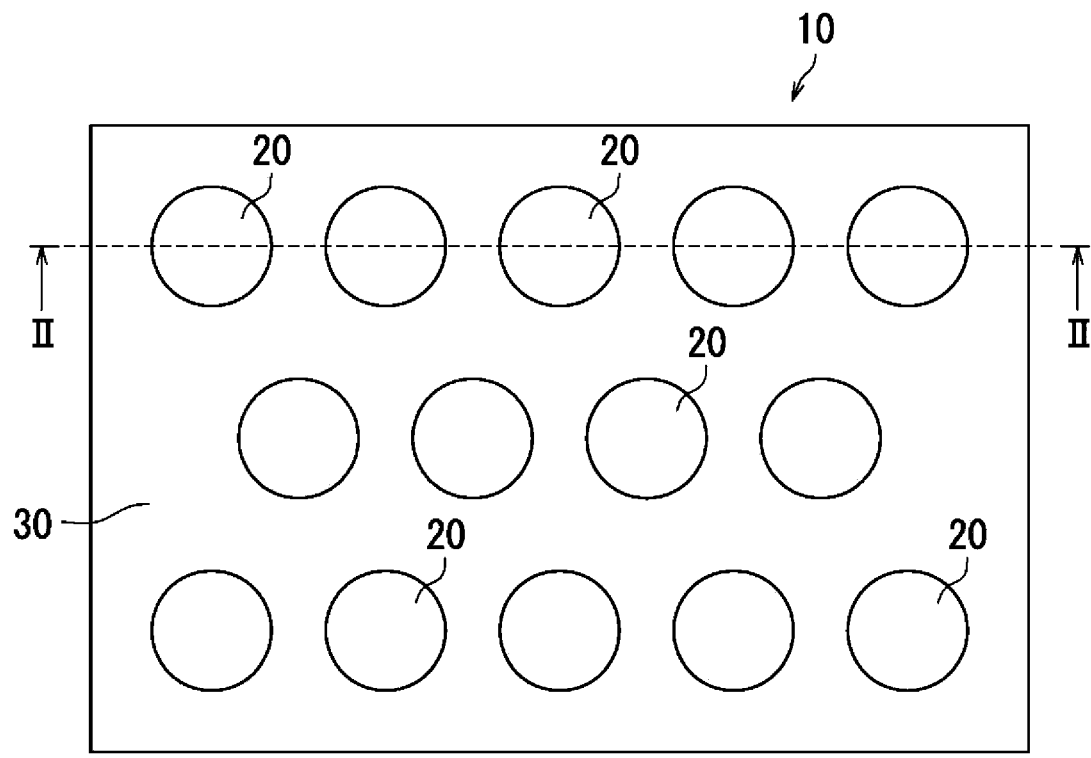
FIG. 1 is a top view illustrating a photocatalyst layer according to an embodiment of the present disclosure.

Embodiment of the present disclosure will now be described with reference to the drawings. In the drawings, the same or similar portions are designated by the same reference signs, and the description thereof will not be repeated. The present disclosure is not limited to embodiments and can be implemented with appropriate modifications within the scope of the present disclosure. Hereinafter, the terms "acrylic" and "methacrylic" may be collectively referred to as "(meth)acrylic".

Photocatalyst Layer

Figure 2:
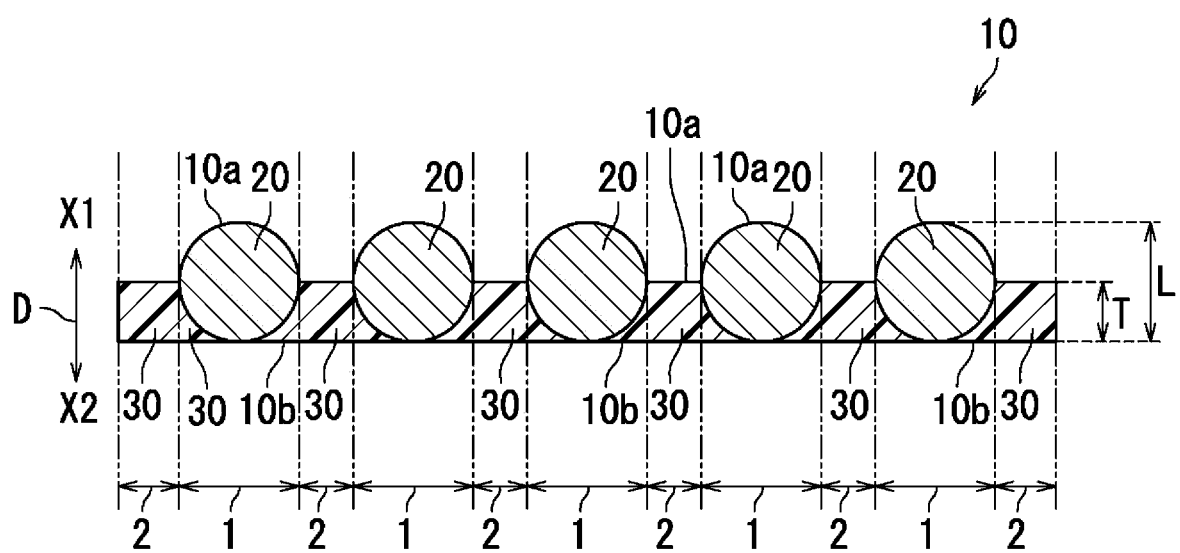
FIG. 2 is a cross-sectional view of the photocatalyst layer taken along the line II-II shown in FIG. 1.
Figure 3:
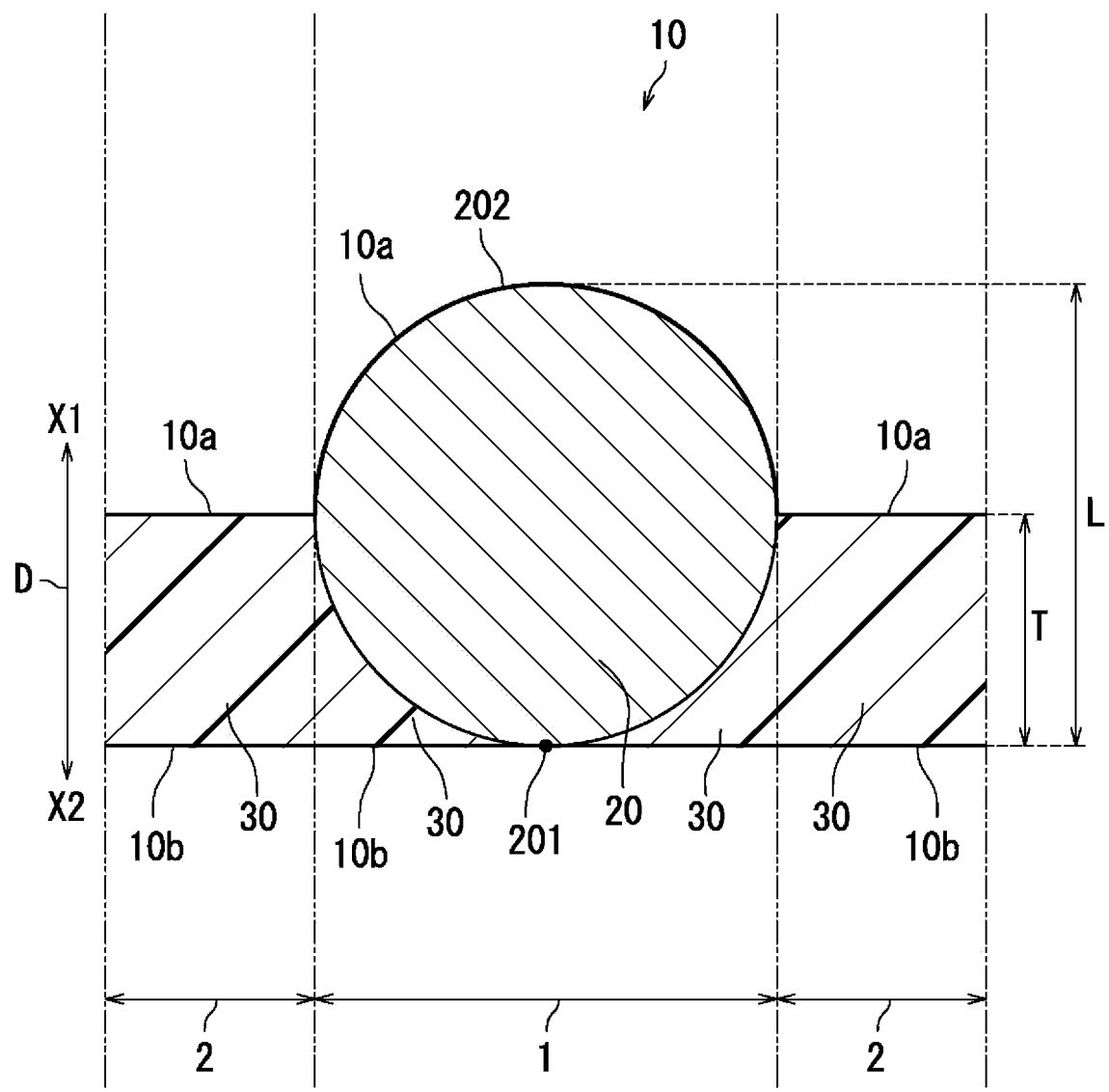
FIG. 3 is an enlarged view of the cross-section of the photocatalyst layer shown in FIG. 2.

The photocatalyst layer 10 of the embodiment will now be described with reference to FIGS. 1 to 3. FIG. 1 shows the upper surface of the photocatalyst layer 10 of the embodiment. FIG. 2 shows the cross-section of the photocatalyst layer 10 along the line II-II shown in FIG. 2. FIG. 3 shows an enlarged cross-section of the photocatalyst layer 10 shown in FIG. 2. In the drawings, "D" represents the thickness direction of the photocatalyst layer 10, "X1" represents the front surface 10a side in the thickness direction of the photocatalyst layer 10, and "X2" represents the rear surface 10b side in the thickness direction of the photocatalyst layer 10.

As shown in FIG. 1, the photocatalyst layer 10 of the embodiment includes photocatalyst particles 20 and a binder 30. As shown in FIG. 2, the photocatalyst layer 10 has a front surface 10a and a rear surface 10b. The rear surface 10b of the photocatalyst layer 10 is the surface on the opposite side of the front surface 10a. The front surface 10a of the photocatalyst layer 10 is an uneven surface. The rear surface 10b of the photocatalyst layer 10 is the surface on the substrate 41, which is described below (see FIG. 7), side. The rear surface 10b of the photocatalyst layer 10 is, for example, a flat surface. The thickness direction D is the direction perpendicular to the rear surface 10b of the photocatalyst layer 10. In addition, the thickness direction D is the direction perpendicular to the surface of the substrate 41.

The photocatalyst layer 10 has a first region 1 and a second region 2. The first region 1 contains the photocatalyst particles 20. The first region 1 may further contain a binder 30, in addition to the photocatalyst particles 20. The second region 2 contains the binder 30 and does not contain the photocatalyst particles 20. Whether a region in the photocatalyst layer 10 falls under the first region 1 or the second region 2 can be determined by the following method. An imaginary line passing through the photocatalyst layer 10 and parallel to the thickness direction D is drawn. When the imaginary line passes through a photocatalyst particle 20, the region of the photocatalyst layer 10 through which the imaginary line passes is the first region 1. When the imaginary does not pass through a photocatalyst particles 20, the region of the photocatalyst layer 10 through which the imaginary passes is the second region 2. The photocatalyst layer 10 includes, for example, a plurality of cylindrical first regions 1 and second region 2 disposed so as to surround the first regions 1.

The ratio of the thickness T of the second region 2 of the photocatalyst layer 10 to the number-average secondary particle diameter L of the photocatalyst particles 20, T/L, is 0.20 or more and 0.80 or less. Hereinafter, the "ratio of the thickness T of the second region 2 of the photocatalyst layer 10 to the number-average secondary particle diameter L of the photocatalyst particles 20, T/L" may be referred to as "ratio T/L". In addition, the "number-average secondary particle diameter" may be referred to as "secondary particle diameter". If the ratio T/L is less than 0.20, the area of the photocatalyst particles 20 being in contact with the binder 30 becomes small. Consequently, the adhesion strength of the photocatalyst particles 20 to the binder 30 is low, and the photocatalyst particles 20 tend to detach from the binder 30. In contrast, if the ratio T/L is higher than 0.80, the photocatalyst particles 20 are buried in the binder 30, and the photocatalyst particles 20 are not exposed or are little exposed. If the photocatalyst particles 20 are not exposed or are little exposed, the photocatalyst particles 20 cannot come into contact with the decomposition object, and the decomposition object is hardly decomposed by the photocatalyst particles 20. Consequently, the photocatalytic performance of the photocatalyst layer 10 decreases. Examples of the decomposition object include volatile organic compounds (VOCs), more specifically, formaldehyde, acetaldehyde, and ammonia. Furthermore, when the ratio T/L is 0.20 or more and 0.80 or less, projections due to the photocatalyst particles 20 are formed on the front surface 10a of the photocatalyst layer 10. Accordingly, when the photocatalyst layer 10 is used in a building material, such as a sand-wall of a Japanese-style room, a mud wall of a Japanese-style room, wallpaper, and tile, rough texture can be expressed. The ratio T/L may be 0.20 or more and 0.50 or less or may be higher than 0.50 and 0.80 or less.

The photocatalyst particles 20 may have a secondary particle diameter L of 30 μm or more and 3000 μm or less, preferably 100 μm or more and 3000 μm or less, more preferably 500 μm or more and 3000 μm or less, and further preferably 1000 μm or more and 3000 μm or less. Photocatalyst particles 20 having a secondary particle diameter L within such a range can be obtained by aggregation of photocatalyst primary particles 21 (see FIG. 5). The photocatalyst particles 20 having a secondary particle diameter L within such a range have the following advantages. If a paint containing photocatalyst particles 20 and a binder 30 is applied when the photocatalyst layer 10 is formed, the binder 30 flows down by the weight of itself from the top ends 203 (see FIG. 9) of the photocatalyst particles 20. As a result of the flowing down, a photocatalyst layer 10 having a ratio T/L of 0.20 or more and 0.80 or less can be easily obtained. The photocatalyst primary particles 21 and the top ends 203 of the photocatalyst particles 20 will be described later.

The thickness T of the second region 2 of the photocatalyst layer 10 is the distance between the front surface 10a and the rear surface 10b in the thickness direction D. The thickness T of the second region 2 of the photocatalyst layer 10 can be 6 μm or more and 2400 μm or less and may be 6 μm or more and 10 μm or less, higher than 10 μm and 100 μm or less, higher than 100 μm and 1000 μm or less, or higher than 1000 μm and 2400 μm or less.

As shown in FIG. 3, the photocatalyst particle 20 has a contact point 201 being in contact with the rear surface 10b of the photocatalyst layer 10. The photocatalyst layer 10 contains tungsten oxide particles as the photocatalyst particles 20. Among metals having photocatalytic performance, tungsten oxide has a large specific gravity. Accordingly, when the photocatalyst layer 10 is formed using a paint containing tungsten oxide particles and a binder 30, tungsten oxide particles tend to sink down in the binder 30 by the weight of itself. Accordingly, the tungsten oxide particles come into contact with the rear surface 10b of the photocatalyst layer 10, and contact points 201 can be efficiently formed in the tungsten oxide particles as the photocatalyst particles 20. The photocatalyst particle 20 having a contact point 201 protrudes to the front surface 10a side of the photocatalyst layer 10 and does not protrude to the rear surface 10b side of the photocatalyst layer 10.

Since the photocatalyst particles 20 have contact points 201 and have a ratio T/L of 0.20 or more and 0.80 or less, the photocatalyst particles 20 are buried in the binder 30 with a depth of 0.20 or more of the secondary particle diameter L. Consequently, the area of the photocatalyst particles 20 being in contact with the binder 30 is large, and the photocatalyst particles 20 are hardly detached from the binder 30.

Furthermore, since the photocatalyst particles 20 have contact points 201 and have a ratio T/L of 0.20 or more and 0.80 or less, the photocatalyst particles 20 are exposed from the binder 30 with a height of 0.20 or more of the secondary particle diameter L. Consequently, the photocatalyst particles 20 come into contact with a decomposition object, and the decomposition object is suitably decomposed by the photocatalyst particles 20. Accordingly, photocatalytic performance of the photocatalyst layer 10 is improved.

The photocatalyst particle 20 further has an exposed region 202 in addition to the contact point 201. The exposed region 202 of the photocatalyst particle 20 protrudes without being covered with the binder 30 and constitutes at least part of the convex surface of the front surface 10a of the photocatalyst layer 10. The convex surface of the front surface 10a of the photocatalyst layer 10 corresponds to the front surface of the first region 1. The exposed region 202 of the photocatalyst particle 20 constitutes at least part of the surface of the first region 1. The exposed region 202 of the photocatalyst particle 20 is directly exposed to the outside air and light. The photocatalyst particles 20 having the exposed regions 202 can come into contact with a decomposition object, and the decomposition object is suitably decomposed by the photocatalyst particles 20. Accordingly, photocatalytic performance of the photocatalyst layer 10 is improved.

For example, one photocatalyst particle 20 has both the contact point 201 and the exposed region 202. The photocatalyst layer 10 containing such photocatalyst particles 20 can satisfy both suppression of detachment of the photocatalyst particles 20 from the binder 30 and improvement of photocatalytic performance. The photocatalyst layer 10 may contain photocatalyst particles not having both or one of the contact point 201 and the exposed region 202.

Figure 4:
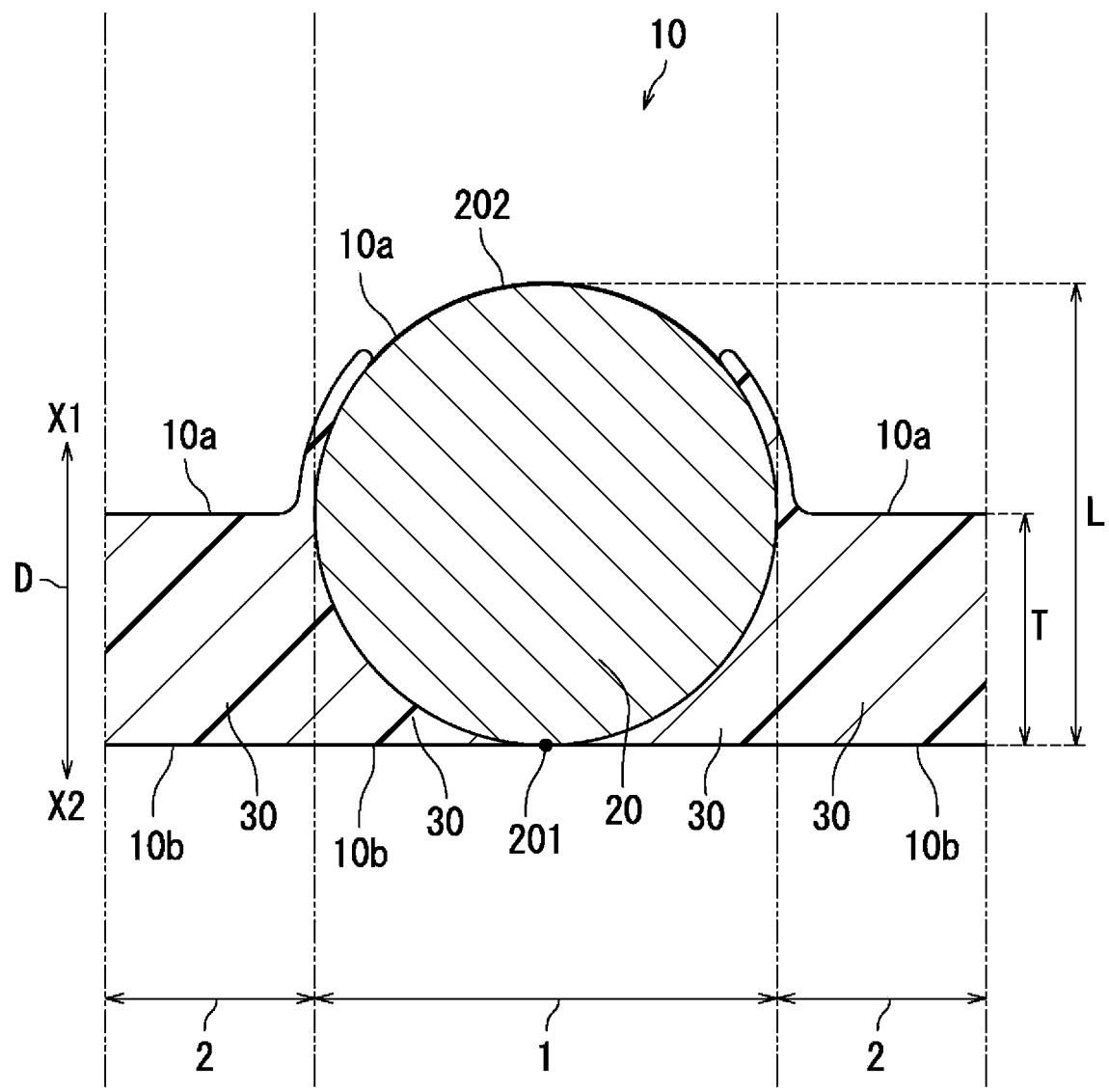
FIG. 4 is a cross-sectional view illustrating another example of the photocatalyst layer according to an embodiment of the present disclosure.

In the photocatalyst layer 10 shown in FIG. 3, the whole region of the front surface of the first region 1 corresponds to the exposed region 202. However, as shown in FIG. 4, part of the front surface of the first region 1 may correspond to the exposed region 202. When the photocatalyst layer 10 is formed using a paint containing the photocatalyst particles 20 and the binder 30, the area of the exposed region 202 can be changed by controlling the viscosity of the paint. For example, since a paint having a lower viscosity more easily flows down, the whole front surface of the first region 1 tends to become an exposed region 202.

Photocatalyst Particle

Figure 5:
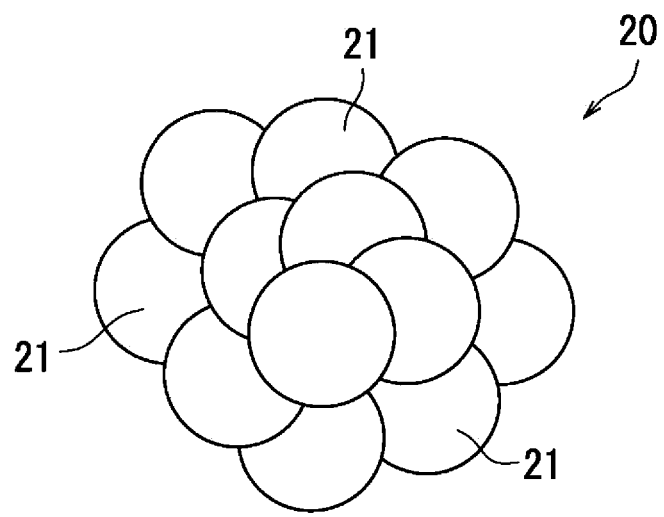
FIG. 5 is a diagram illustrating photocatalyst particles which are contained in a photocatalyst layer according to an embodiment of the present disclosure.
Figure 6:
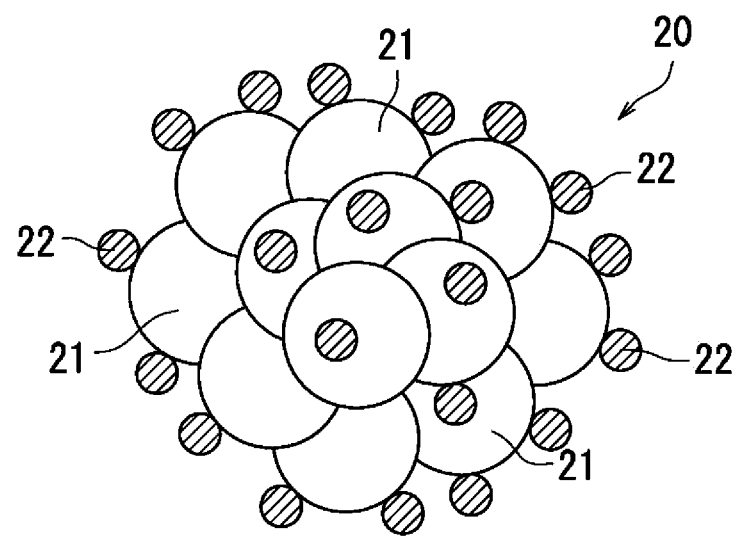
FIG. 6 is a diagram illustrating another example of the photocatalyst particles which are contained in a photocatalyst layer according to an embodiment of the present disclosure.

The photocatalyst particle 20 will now be described with reference to FIGS. 5 and 6. FIG. 5 shows a photocatalyst particle 20. FIG. 6 shows another example of the photocatalyst particle 20. These photocatalyst particles 20 are secondary particles formed by aggregation of photocatalyst primary particles 21.

The photocatalyst particles 20 include tungsten oxide particles. Examples of the tungsten oxide contained in the tungsten oxide particles include $WO_3$ (tungsten trioxide), $WO_2$ (tungsten dioxide), WO, $W_2O_3$, $W_4O_5$, $W_4O_{11}$, $W_{25}O_{73}$, $W_{20}O_{58}$, $W_{24}O_{68}$, and mixtures thereof. In order to improve the photocatalytic performance, $WO_3$ may be used as the tungsten oxide.

The tungsten oxide contained in the tungsten oxide particles may have any crystal structure. Examples of the crystal structure of the tungsten oxide include monoclinic, triclinic, orthorhombic, and mixed crystals of at least two thereof.

The photocatalyst layer 10 may contain one type of tungsten oxide particles or two or more types of tungsten oxide particles as the photocatalyst particles 20. In addition, the photocatalyst layer 10 may further contain photocatalyst particles other than tungsten oxide particles, in addition to tungsten oxide particles, as the photocatalyst particles 20.

As shown in FIG. 6, the tungsten oxide particles as the photocatalyst particles 20 may support auxiliary catalyst particles 22. By supporting the auxiliary catalyst particles 22, the photocatalytic performance of the photocatalyst layer 10 can be improved. For example, the photocatalyst primary particles 21 are provided with the auxiliary catalyst particles 22 on the surfaces. The photocatalyst particle 20 shown in FIG. 6 is a secondary particle formed by aggregation of photocatalyst primary particles 21 supporting auxiliary catalyst particles 22 on the surfaces. One type of auxiliary catalyst particles 22 may be supported, or two types of auxiliary catalyst particles 22 may be supported.

Examples of the metal contained in the auxiliary catalyst particles 22 include platinum (Pt), gold (Au), silver (Ag), copper (Cu), zinc (Zn), palladium, iron, nickel, ruthenium, iridium, niobium, zirconium, and molybdenum. These metals may be contained in the auxiliary catalyst particle 22 in a form of, for example, a complex, a chloride, a bromide, an iodide, an oxide, a hydroxide, a sulfate, a nitrate, a carbonate, an acetate, a phosphate, or an organic salt. Examples of the auxiliary catalyst particles 22 include platinum particles, silver particles, and copper particles.

The content of the auxiliary catalyst particles 22 based on the mass of the photocatalyst particles 20 (hereinafter, may be referred to as auxiliary catalyst carrying rate) can be 0.01 mass % or more and 3 mass % or less. If the auxiliary catalyst carrying rate is within this range, the photocatalytic performance of the photocatalyst layer 10 can be further improved.

Binder

Examples of the binder 30 include silicone resins, acrylic resins, and condensation products of silane coupling agents. The silicone resin includes a siloxane bond as the main skeleton. The silicone resin is, for example, a silicone resin having a methyl group. As the silicone resin having a methyl group, for example, "KR-220LP", manufactured by Shin-Etsu Chemical Co., Ltd. can be used.

The acrylic resin is a polymer of at least one type of (meth)acrylate. Examples of the acrylic resin include polymers of alkyl (meth)acrylates. Examples of the polymers of alkyl (meth)acrylates include poly(methyl (meth)acrylate), poly(ethyl (meth)acrylate), poly(propyl (meth)acrylate), poly(butyl (meth)acrylate), poly(pentyl (meth)acrylate), and poly(hexyl (meth)acrylate). Among the polymers of alkyl (meth)acrylates, poly(methyl methacrylate) may be used. As poly(methyl methacrylate), for example, "Acrypet VH", manufactured by Mitsubishi Chemical Corporation can be used.

The condensation product of a silane coupling agent is formed by dehydration condensation of a silane coupling agent. The silane coupling agent for forming the condensation product is not particularly limited, and a known silane coupling agent can be appropriately used. A part of hydroxyl groups possessed by a silane coupling agent or a part of hydroxyl groups generated by hydrolysis of the alkoxy groups possessed by a silane coupling agent reacts (dehydration) with hydroxyl groups present on the surface of the substrate 41. Such reaction forms a bond between the substrate 41 and the binder 30. In addition, a part of hydroxyl groups possessed by a silane coupling agent or a part of hydroxyl groups generated by hydrolysis of the alkoxy groups possessed by a silane coupling agent reacts (dehydration) with hydroxyl groups present on the surface of the photocatalyst particle 20. Such reaction forms a bond between the photocatalyst particle 20 and the binder 30. By forming such a bond, the photocatalyst particle 20 has a contact point 201, and the photocatalyst particles 20 and the substrate 41 can be tightly bonded to each other through the binder 30, even if there is a region not including the binder 30 between the substrate 41 and the photocatalyst particles 20.

Examples of the silane coupling agent include silane coupling agents (hereinafter, referred to as silane coupling agent (1)) represented by Formula (1):

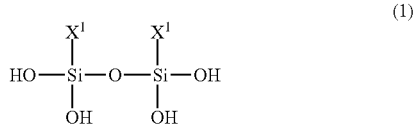

(1)

In Formula (1), $X^1$s each independently represent an organic group. Examples of the organic group represented by $X^1$ include a —$NR^AR^B$ group (where, $R^A$ represents a hydrogen atom, an aminoalkyl group, a hydroxyalkyl group, or a dihydroxyalkyl group; and $R^B$ represents a hydrogen atom, an aminoalkyl group, a hydroxyalkyl group, or a dihydroxyalkyl group), a 1,2-dihydroxyethyl group, a carboxyl group, a vinyl group, and a quaternary ammonium group. $X^1$ can represent a —$NR^AR^B$ group and may represent an amino group, an (aminoethyl)amino group, or a bis(2,3-dihydroxypropyl)amino group, in particular, an amino group. As the silane coupling agent (1), for example, "KBP-90", manufactured by Shin-Etsu Chemical Co., Ltd. can be used. "KBP-90" is a silane coupling agent in which both $X^1$s in Formula (1) are amino groups.

When the photocatalyst layer 10 is formed using a paint containing the silane coupling agent (1), a part of the hydroxyl groups possessed by the silane coupling agent (1) are bonded to one another by dehydration condensation to form a silanol bond. A part of the remaining hydroxyl groups react (dehydration) with the hydroxyl groups present on the surface of the substrate 41 or the photocatalyst particle 20. Consequently, bonds are formed between the substrate 41 and the binder 30 and between the photocatalyst particle 20 and the binder 30. As a result, formed is a condensation product of the silane coupling agent (1) including repeating units represented by the following Formula (1-1):

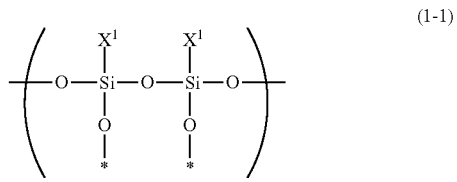

(1-1)

In Formula (1-1), $X^1$ is synonymous with that in Formula (1). In Formula (1-1), * represents a bonding hand with the substrate 41 or the photocatalyst particle 20.

Other examples of the silane coupling agent include silane coupling agents (hereinafter, referred to as silane coupling agent (2)) represented by Formula (2):

(2)

In Formula (2), $X^2$ represents an organic group. Examples of the organic group represented by $X^2$ include a vinyl group, an epoxy group, an amino group, a methacryloyl group, an acryloyl group, an isocyanate group, and a mercapto group. In Formula (2), $R^1$, $R^2$, and $R^3$ each independently represent an alkyl group having 1 to 6 carbon atoms. $R^1$, $R^2$, and $R^3$ may each independently represent a methyl group or an ethyl group.

When the photocatalyst layer 10 is formed using a paint containing the silane coupling agent (2), the alkoxy group (more specifically, $OR^1$ group, $OR^2$ group, and $OR^3$ group) contained in the silane coupling agent (2) is hydrolyzed into a hydroxyl group. A part of the hydroxyl groups generated by the hydrolysis are bonded to one another by dehydration condensation to form a silanol bond. A part of the remaining hydroxyl groups react (dehydration) with the hydroxyl groups present on the surface of the substrate 41 or the photocatalyst particle 20. Thus, a condensation product of the silane coupling agent (2) is formed.

Additive

The photocatalyst layer 10 may further contain an additive, as necessary. Examples of the additive include silicon compounds, aluminum compounds, aluminosilicates, alkali earth metals, calcium phosphate, molecular sieves, and activated carbon.

Photocatalyst

Figure 7:
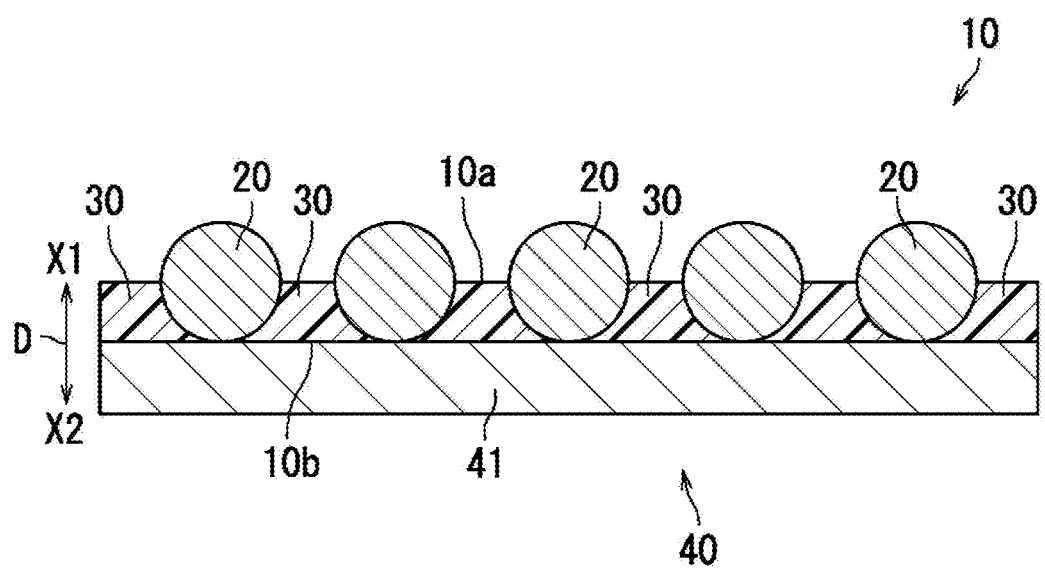
FIG. 7 is a cross-sectional view illustrating an example of a photocatalyst which includes a photocatalyst layer according to an embodiment of the present disclosure.

A photocatalyst 40 including the photocatalyst layer 10 of the embodiment will now be described with reference to FIG. 7. The photocatalyst 40 includes the substrate 41 and the photocatalyst layer 10 of the embodiment. The photocatalyst layer 10 is provided on the substrate 41. The rear surface 10b of the photocatalyst layer 10 is disposed on the substrate 41 side. The photocatalyst layer 10 may be disposed directly on the substrate 41. In such a case, the rear surface 10b of the photocatalyst layer 10 may be in contact with the substrate 41. Alternatively, the photocatalyst layer 10 may be disposed on the substrate 41 with a primer layer therebetween. In this case, the primer layer is disposed between the rear surface 10b of the photocatalyst layer 10 and the substrate 41. The primer layer is formed of an anchor coat.

Examples of the material for the substrate 41 (specifically, backing) include metals, metal oxides, glass, plastic, ceramics, wood, stone, cement, concrete, fibers, fabric, paper, leather, and combinations thereof. The substrate 41 may be a layered product composed of a plurality of layers containing different materials.

Figure 8:
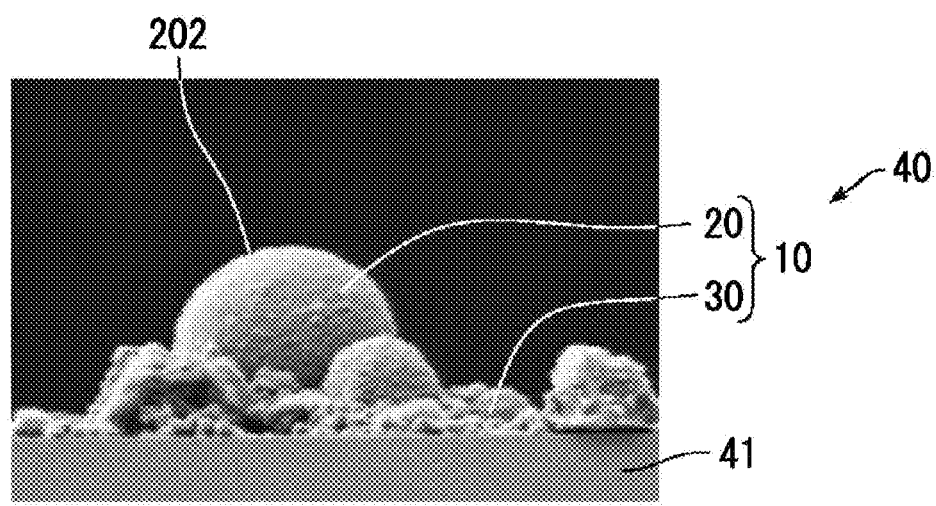
FIG. 8 is an electron microscopic view showing an example of the photocatalyst which includes a photocatalyst layer according to an embodiment of the present disclosure.

FIG. 8 shows an electron micrograph of an example of the photocatalyst 40. The electron micrograph is taken by observing the photocatalyst 40 with a field-emission scanning electron microscope ("S-4300SE", manufactured by Hitachi High-Technologies Corporation) at a magnification of 10000×. It can be verified from the electron micrograph shown in FIG. 8 that the photocatalyst layer 10 is formed on the substrate 41 and that the photocatalyst particle 20 of the photocatalyst layer 10 has an exposed region 202 protruding without being covered with the binder 30.

Method for Manufacturing Photocatalyst

A method for manufacturing a photocatalyst 40 will now be described. The method for manufacturing a photocatalyst 40 includes a primary grinding process, a secondary grinding process, and a photocatalyst layer-forming process. The method for manufacturing a photocatalyst 40 may further include an auxiliary catalyst-supporting process, as necessary.

Primary Grinding Process

In the primary grinding process, photocatalyst particles 20 are primarily ground in liquid, and at least part of the liquid is then removed to give agglomerates of the photocatalyst particles 20. The primary grinding is wet grinding using liquid. The number-average primary particle diameter of photocatalyst particles 20 (number-average particle diameter of photocatalyst primary particles 21) can be decreased by the primary grinding. Hereinafter, the "number-average primary particle diameter" may be referred to as "primary particle diameter". The surface area of the photocatalyst particle 20 increases with decreasing in the primary particle diameter, and the decomposition object and the photocatalyst particle 20 tend to come into contact with each other. Consequently, the photocatalytic performance of the photocatalyst layer 10 can be improved. The primary particle diameter of the photocatalyst particles 20 can be 1000 nm or less and may be 500 nm or less, 200 nm or less, or 100 nm or less. Although the lower limit of the primary particle diameter of the photocatalyst particles 20 is not particularly limited, the lower limit can be 10 nm or more.

Examples of the liquid used in the primary grinding include water and ethanol. Examples of the grinder mill for primary grinding include a homogenizer, an ultrasonic disperser, and a bead mill. The primary particle diameter of the photocatalyst particles 20 decreases with increasing in the circumferential velocity of the grinder mill performing the primary grinding and with increasing in the time of the primary grinding. Examples of the method for removing at least part of the liquid include air drying and heat drying.

The agglomerates of the photocatalyst particles 20 prepared by the primary grinding process are used in the secondary grinding process. However, when the auxiliary catalyst-supporting process described below is performed, after primary grinding of the photocatalyst particles 20 in liquid, the liquid containing the photocatalyst particles 20 may be used in the auxiliary catalyst-supporting process without removing at least part of the liquid.

Auxiliary Catalyst-Supporting Process

In the auxiliary catalyst-supporting process, auxiliary catalyst particles 22 are supported on tungsten oxide particles. Examples of the method for supporting the auxiliary catalyst particles 22 include a method by heat treatment, a method by photodeposition with ultraviolet light, and a method by photodeposition with visible light.

In the auxiliary catalyst-supporting process, instead of the auxiliary catalyst particles 22, a precursor of the auxiliary catalyst particles 22 may be added. The precursor of the auxiliary catalyst particles 22 is heated to change into auxiliary catalyst particles 22, and the auxiliary catalyst particles 22 are supported on tungsten oxide particles. When the auxiliary catalyst particles 22 are platinum particles, as the precursor of the auxiliary catalyst particles 22, for example, platinum(II) oxide, platinum(IV) oxide, platinum (II) chloride, platinum(IV) chloride, chloroplatinic acid, hexachloroplatinic acid, tetrachloroplatinic acid, or a complex thereof can be used. When the auxiliary catalyst particles 22 are silver particles, as the precursor of the auxiliary catalyst particles 22, for example, silver nitrate can be added. When the auxiliary catalyst particles 22 are copper particles, as the precursor of the auxiliary catalyst particles 22, for example, copper acetate can be added.

Secondary Grinding Process

In the secondary grinding process, the agglomerates of the photocatalyst particles 20 prepared in the primary grinding process are secondarily ground in gas. When the auxiliary catalyst-supporting process is performed, the photocatalyst particles 20 prepared in the auxiliary catalyst-supporting process (specifically, tungsten oxide particles supporting the auxiliary catalyst particles 22) are secondarily ground in gas. The secondary particle diameter L of the photocatalyst particles 20 is adjusted by the secondary grinding. The secondary grinding is dry grinding which is carried out in gas. The secondary grinding can aggregate the photocatalyst primary particles 21 to obtain photocatalyst particles 20 having a secondary particle diameter L of 30 μm or more and 3000 μm or less.

The secondary grinding in gas is, for example, performed in the atmosphere or in an inert gas atmosphere. The secondary grinding can be performed with a grinder mill. Examples of the grinder mill for performing the secondary grinding include impingement mills (for example, impinging jet mill), fluidized bed mills (for example, fluidized bed jet mill), mechanical mills (for example, hammer mill), and ball mills. The secondary grinding can also be performed using a mortar and pestle. The secondary particle diameter L of the photocatalyst particles 20 increases with decreasing the time of the secondary grinding.

The secondarily ground product of the photocatalyst particles 20 may be directly used in the photocatalyst layer-forming process. Alternatively, the secondarily ground product of the photocatalyst particles 20 may be classified, and the classified photocatalyst particles 20 may be used in the photocatalyst layer-forming process. The secondary particle diameter L of the photocatalyst particles 20 can be further adjusted by classifying the secondarily ground product of the photocatalyst particles 20. Examples of the classifier include a pneumatic classifier and a shaking sieve. The secondary particle diameter L of the photocatalyst particles 20 can be adjusted by changing the classification conditions. For example, when a shaking sieve is used for classification, the secondary particle diameter L of the photocatalyst particles 20 is increased by increasing the mesh diameter of the sieve.

Photocatalyst Layer-Forming Process

Figure 9:
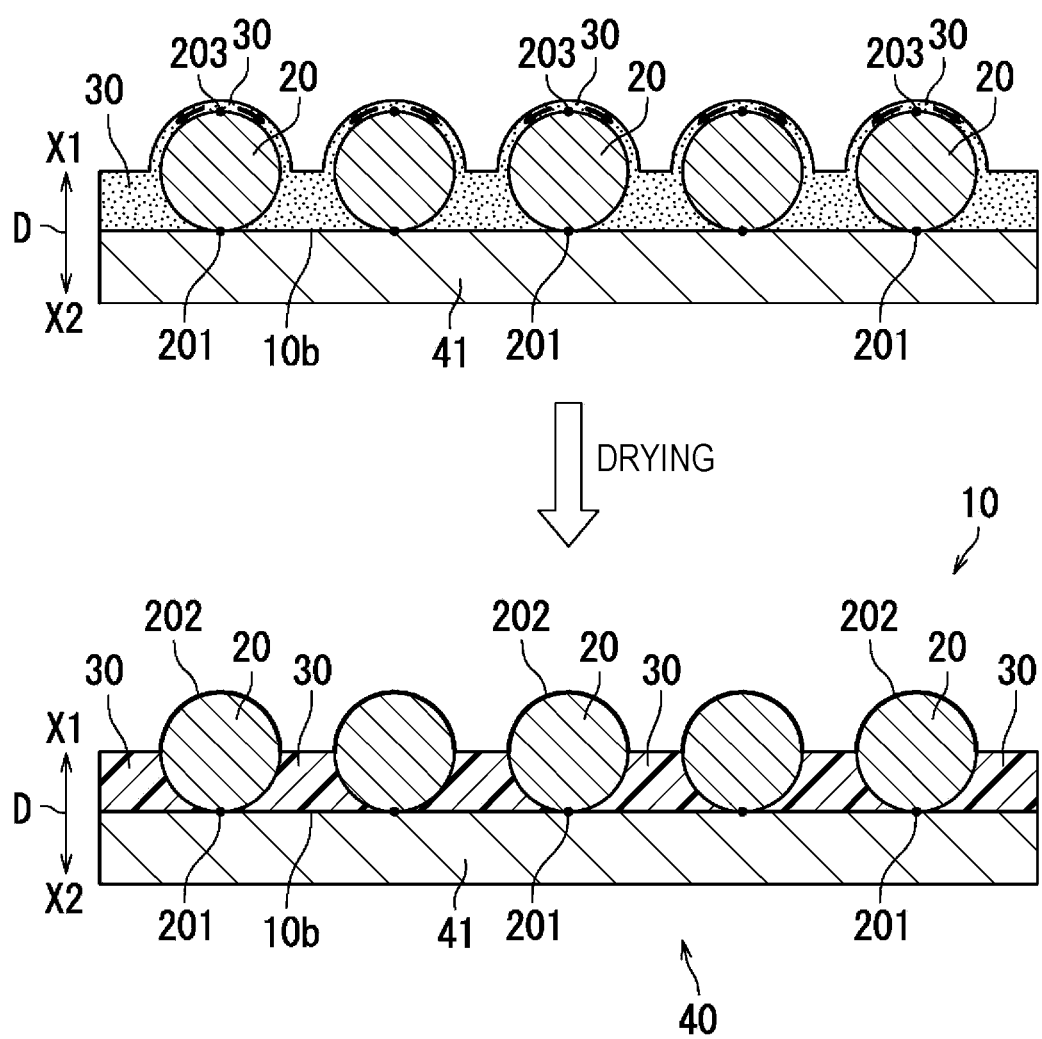
FIG. 9 is a diagram illustrating an example of the photocatalyst layer-forming process.

The photocatalyst layer-forming process will now be described with reference to FIG. 9. FIG. 9 shows an example of the photocatalyst layer-forming process. In the photocatalyst layer-forming process, a paint containing photocatalyst particles 20 and a binder 30 is applied onto a substrate 41 and is dried. Consequently, a photocatalyst layer 10 is formed on the substrate 41. Thus, a photocatalyst 40 is manufactured. The rear surface 10b of the photocatalyst layer 10 is the surface on the substrate 41 side.

As shown in the upper diagram of FIG. 9, when the paint is applied onto the substrate 41, the photocatalyst particles 20 sink down in the paint by the weight of itself and come into contact with the substrate 41. As the consequence of the contact, a contact point 201, which is in contact with the rear surface 10b of the photocatalyst layer 10 (corresponding to the surface of the substrate 41), is formed on the photocatalyst particle 20. In addition, when the paint is applied onto the substrate 41, the binder 30 flows down by the weight of itself from the top end 203 (corresponding to the portion of the surface of the photocatalyst particle 20 far from the substrate 41) of the photocatalyst particle 20 in the direction of the arrow. The binder 30 after flowing down is dried to form exposed regions 202 protruding without being covered with the binder 30 on photocatalyst particles 20, as shown in the lower diagram of FIG. 9.

The paint contains the photocatalyst particles 20 and the binder 30. The paint may further contain a solvent for dissolving the binder 30. Examples of the solvent include polar solvents, more specifically, water, methanol, ethanol, and isopropanol. The paint may further contain an additive. The paint is applied onto the substrate 41 in a state in which the photocatalyst particles 20 and the binder 30 are mixed in the paint. Accordingly, in the embodiment, the area of the photocatalyst particles 20 being in contact with the binder 30 is larger than that in the case in which a binder is first applied onto a substrate to form a binder layer and a photocatalyst is then applied onto the binder layer. Consequently, according to the embodiment, the photocatalyst particles 20 are hardly detached from the binder 30. In order to efficiently form the contact points 201, the photocatalyst particles 20 may have a specific gravity larger than that of the component (for example, the binder 30, or mixture of the binder 30 and the solvent) other than the photocatalyst particles 20 in the paint.

The secondary particle diameter L of the photocatalyst particles 20 contained in the paint and the mass ratio of the binder to the mass of the photocatalyst particles 20 in the paint (for example, the addition amount of the photocatalyst particles 20 and the addition amount of the binder 30) may be adjusted so that the ratio T/L is 0.20 or more and 0.80 or less. Consequently, a photocatalyst layer 10 having a ratio T/L of 0.20 or more and 0.80 or less can be formed without performing surface treatment.

Examples of the method for applying a paint to a substrate 41 include spin coating method, dipping method, spraying method, roll coating method, gravure method, wire bar method, air knife method, ink jet method, and brush coating method. As the method for applying a paint to a substrate 41, for example, the paint may be poured into a mold in which the substrate 41 is placed, or the paint may be poured into a container in which the substrate 41 is placed on the bottom.

Examples of the method for drying the paint applied to the substrate 41 include air drying and heat drying. The temperature for drying the paint applied to the substrate 41 may be 40° C. or more and 100° C. or less.

Figure 10:
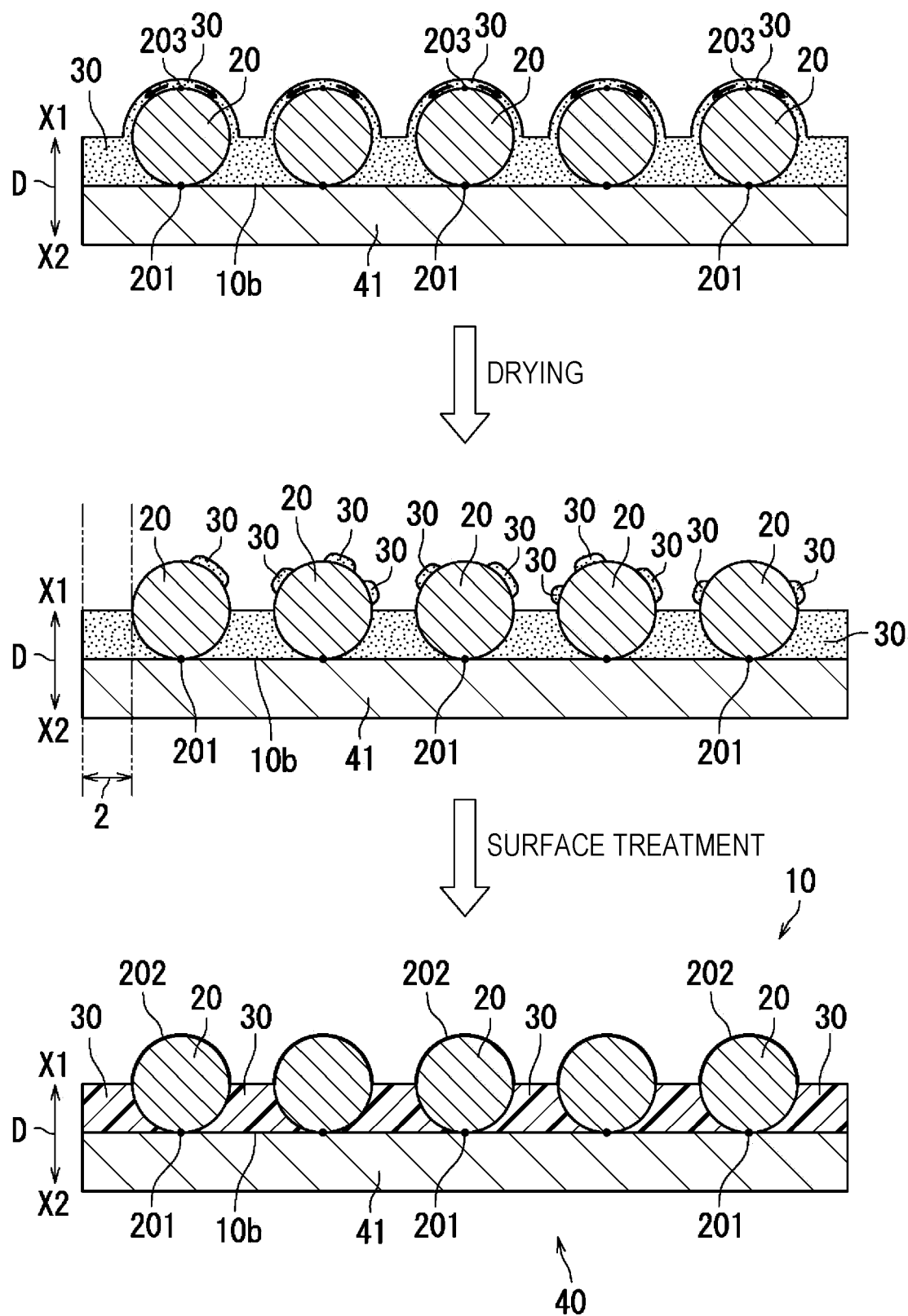
FIG. 10 is a diagram illustrating another example of the photocatalyst layer-forming process.

In the photocatalyst layer-forming process, the paint applied to the substrate 41 and dried may be subjected to surface treatment. A case of performing surface treatment in the photocatalyst layer-forming process will now be described with reference to FIG. 10. FIG. 10 shows another example of the photocatalyst layer-forming process. As shown in the upper diagram of FIG. 10, in the paint applied onto the substrate 41, the binder 30 flows down by the weight of itself from the top end 203 of the photocatalyst particle 20 in the direction of the arrow. After flowing down of the binder 30, the paint is dried. After drying, as shown in the center diagram of FIG. 10, the binder 30 may remain on the surface region of the photocatalyst particle 20 protruding than the front surface of the second region 2. Accordingly, part of the binder 30 in the paint is removed by subjecting the dried paint to surface treatment. Part of the binder 30 to be removed is, for example, the binder 30 remaining on the surface region of the photocatalyst particle 20 protruding than the front surface of the second region 2. By thus-removing the binder 30, as shown in the lower diagram of FIG. 10, a photocatalyst layer 10 having a ratio T/L of 0.20 or more and 0.80 or less is formed. In addition, by thus-removing the binder 30, the photocatalyst particles 20 protrude without being covered with the binder 30. Furthermore, by thus-removing the binder 30, the exposed region 202 protruding without being covered with the binder 30 can be broadened.

The surface treatment may remove not only the binder 30 remaining on the surface region of the photocatalyst particles 20 protruding than the front surface of the second region 2 but also part of the binder 30 contained in the second region 2. The ratio T/L can be adjusted within a desired range by removing part of the binder 30 contained in the second region 2.

The surface treatment is, for example, plasma irradiation treatment. In the plasma irradiation treatment, the dried paint on the substrate 41 is irradiated with plasma using a plasma radiator. The binder 30, which is an organic material, is decomposed by plasma irradiation. Tungsten oxide particle, which is an inorganic material, is hardly decomposed even if irradiated with plasma. Consequently, the exposed region 202 can be formed on the photocatalyst particle 20 by plasma irradiation. Examples of the plasma radiator include a plasma cleaner. The output of plasma can be 100 W or more and 300 W or less. Although the time of plasma irradiation varies depending on, for example, the output and the irradiation conditions, the time is, for example, 1 minute or more and 1 hour or less.

Another example of the surface treatment is ultraviolet irradiation treatment. In the ultraviolet irradiation treatment, the dried paint on the substrate 41 is irradiated with ultraviolet light using an ultraviolet irradiation device. The binder 30, which is an organic material, is decomposed by ultraviolet irradiation. Tungsten oxide particle, which is an inorganic material, is hardly decomposed even if irradiated with ultraviolet light. Consequently, the exposed region 202 can be formed on the photocatalyst particle 20 by ultraviolet irradiation. Examples of the ultraviolet irradiation device include an UV-ozone cleaner. The wavelength of the ultraviolet light to be irradiated can be 150 nm or more and 350 nm or less. The ultraviolet light source is, for example, a low-pressure mercury lamp or an excimer lamp. The wavelength ($\lambda$) of ultraviolet light irradiated from a low-pressure mercury lamp is, for example, 254 nm and 185 nm. The wavelength ($\lambda$) of ultraviolet light irradiated from an excimer lamp is, for example, at least one selected from the wavelengths of 308 nm (XeCl*lamp), 227 nm (KrCl*lamp), 172 nm ($Xe_2$*lamp), 126 nm ($Ar_2$*lamp), and 146 nm ($Kr_2$*lamp). Although the time of ultraviolet irradiation varies depending on, for example, the irradiance and the irradiation conditions, the time is, for example, 1 minute or more and 1 hour or less.

Further another example of the surface treatment is polishing treatment. In the polishing treatment, the dried paint on the substrate 41 is polished using a polishing machine. The binder 30 is softer than the photocatalyst particles 20. Accordingly, by the polishing treatment, the binder 30 is ground down before the photocatalyst particles 20 is ground. Consequently, the exposed region 202 can be formed on the photocatalyst particle 20. Examples of the polishing machine include sand blasting. The polishing conditions can be controlled such that the binder 30 is ground down, but the photocatalyst particles 20 are not. Alternatively, the polishing conditions can be controlled such that the polishing amount of the binder 30 is higher than that of the photocatalyst particles 20.

EXAMPLES

The present disclosure will now be more specifically described by examples, but is not limited to the examples. Tables 1 and 2 show the configurations of photocatalyst layers (A-1) to (A-11) and (B-1) to (B-5) according to Examples and Comparative Examples.

TABLE 1

| | Photocatalyst layer | Photocatalyst particles | | | | | | Photocatalyst layer-forming process | |
|---|---|---|---|---|---|---|---|---|---|
| | | Particle diameter L [μm] | Auxiliary catalyst | Binder Type | Thickness T [μm] | T/L | Contact point | Application | Surface treatment |
| Example 1 | A-1 | 30 | None | Silicone resin | 6 | 0.20 | Exist | Simultaneous | None |
| Example 2 | A-2 | 30 | None | Sillcone resin | 24 | 0.80 | Exist | Simultaneous | None |
| Example 3 | A-3 | 3000 | None | Silicone resin | 600 | 0.20 | Exist | Simultaneous | None |
| Example 4 | A-4 | 3000 | None | Sillcone resin | 2400 | 0.80 | Exist | Simultaneous | None |
| Example 5 | A-5 | 30 | None | Acrylic resin | 24 | 0.80 | Exist | Simultaneous | None |
| Example 6 | A-6 | 30 | Pt | Silicone resin | 24 | 0.80 | Exist | Simultaneous | None |
| Example 7 | A-7 | 30 | Ag | Silicone resin | 24 | 0.80 | Exist | Simultaneous | None |
| Example 8 | A-8 | 30 | Cu | Silicone resin | 24 | 0.80 | Exist | Simultaneous | None |

TABLE 2

| | Photocatalyst layer | Photocatalyst particles | | | | | | Photocatalyst layer-forming process | |
|---|---|---|---|---|---|---|---|---|---|
| | | Particle diameter L [μm] | Auxiliary catalyst | Binder Type | Thickness T [μm] | T/L | Contact point | Application | Surface treatment |
| Example 9 | A-9 | 3000 | None | Acrylic resin | 2400 | 0.80 | Exist | Simultaneous | Plasma irradiation |
| Example 10 | A-10 | 1000 | None | Silicone resin | 800 | 0.80 | Exist | Simultaneous | None |
| Example 11 | A-11 | 30 | None | Silane coupling agent | 24 | 0.80 | Exist | Simultaneous | None |
| Comparative Example 1 | B-1 | 3000 | None | Silicone resin | 450 | 0.15 | Exist | Simultaneous | None |
| Comparative Example 2 | B-2 | 3000 | None | Silicone resin | 3000 | 1.00 | Exist | Simultaneous | None |
| Comparative Example 3 | B-3 | 30 | None | Silicone resin | 4 | 0.13 | Exist | Simultaneous | None |
| Comparative Example 4 | B-4 | 30 | None | Silicone resin | 30 | 1.00 | Exist | Simultaneous | None |
| Comparative Example 5 | B-5 | 30 | None | Silicone resin | 24 | 0.80 | None | Application of binder, then application of photocatalyst | None |

The meanings of the terms in Tables 1 and 2 are as follows. "Particle diameter L" refers to the "number-average secondary particle diameter L of photocatalyst particles". "Thickness T" refers to the "thickness T of a second region". "T/L" refers to the "ratio T/L of the thickness T of a second region to the number-average secondary particle diameter L of photocatalyst particles". "Contact point" refers to the "contact point where a photocatalyst particle is in contact with the rear surface of a photocatalyst layer". "Silane coupling agent" refers to the "condensation product of a silane coupling agent". "Simultaneous" in the column "Application" means that photocatalyst particles and a binder are mixed, and the mixture is then applied onto a substrate. "Application of binder, then application of photocatalyst" in the column "Application" means that a binder layer is formed by applying a binder onto a substrate, and then photocatalyst particles are applied onto the binder layer.

There will be described methods for producing photocatalyst layers (A-1) to (A-11) and (B-1) to (B-5) shown in Tables 1 and 2, methods for measurement, methods for evaluation, and results of evaluation.

Method for Production

Production of Photocatalyst Layer (A-1)

Primary Grinding Process

Photocatalyst particles ($WO_3$, manufactured by Kishida Chemical Co., Ltd., 135 g) and deionized water (1215 g) were subjected to primary grinding with a bead mill (media agitating wet ultrafine grinding and dispersing machine "MSC50", manufactured by Nippon Coke & Engineering Co., Ltd.) to prepare a photocatalyst particle dispersion. In the bead milling, beads having a diameter of 0.1 mm (manufactured by Nikkato Corporation) were used. The conditions for bead milling were a circumferential velocity of 10 m/sec and a treatment time of 360 minutes. The primary particle diameter of the photocatalyst particles contained in the dispersion after primary grinding was about 50 nm. The dispersion after primary grinding was dried at 100° C. to prepare agglomerates of the photocatalyst particles.

Secondary Grinding Process

The agglomerates of the photocatalyst particles prepared in the primary grinding process were ground with a mortar and pestle to obtain a ground product of the photocatalyst particles. The ground product of the photocatalyst particles was classified with a shaking sieve to obtain photocatalyst particles passed through a sieve with an aperture of 63 μm. Consequently, photocatalyst particles having a desired secondary particle diameter were prepared. The resulting photocatalyst particles had a secondary particle diameter L of 30 μm.

Photocatalyst Layer-Forming Process

A predetermined amount of a binder (silicone resin, "KR-220LP", manufactured by Shin-Etsu Chemical Co., Ltd.) was dissolved in isopropyl alcohol to prepare a binder solution. A predetermined amount of the photocatalyst particles prepared in the secondary grinding process and the whole amount of the binder solution were mixed to prepare a paint. The paint was poured into a (glass) container of which the base area was known and was dried at 50° C. After the solvent (isopropyl alcohol) was sufficiently volatilized, heating at 85° C. was performed for 1 hour to completely volatilize the solvent. Consequently, photocatalyst layer (A-1) was prepared. The addition amount (predetermined amount) of the binder and the addition amount (predetermined amount) of the photocatalyst particles were adjusted such that the thickness T of the second region was 6 μm and the ratio T/L was 0.20. The addition amount of the binder and the addition amount of the photocatalyst particles were each determined according to the "Method for determining addition amount" described below.

Method for Determining Addition Amount

The method for determining the addition amount of photocatalyst particles is as follows. The secondary particle diameter L (unit: μm) of photocatalyst particles was measured by the method described later. It was assumed that photocatalyst particles with a circular cross section were closely packed in a single layer on the bottom of a container. Based on this assumption, the addition amount (unit: g) of the photocatalyst particles was calculated by the expression: addition amount of photocatalyst particle=$\rho \times 0.907 \times V_{pc} \times S/S_{pc}$, from the two-dimensional closest packing ratio of 0.907, the secondary particle diameter L (unit: μm) of photocatalyst particles, the base area S (unit: cm$^2$) of the container, the density $\rho$ (unit: g/cm$^3$) of the photocatalyst, the volume $V_{pc}$ (unit: cm$^3$, value calculated by $V_{pc}=4/3\times \pi \times (L \times 10^{-4}/2)^3$) of one photocatalyst particle, and the projected area $S_{pc}$ (unit: cm$^2$, value calculated by $S_{pc}=\pi \times (L \times 10^{-4}/2)^2$) of one photocatalyst particle.

The method for determining the addition amount of a binder is as follows. The secondary particle diameter L (unit: μm) of photocatalyst particles was measured by the method described later. The targeted ratio T/L was then determined, and the thickness T (unit: μm) of the second region was calculated from the expression: thickness T of second region=(secondary particle diameter L of photocatalyst particles)×(ratio T/L). The addition amount (unit: g) of the binder was calculated by the expression: addition amount of binder=$(1\times 10^{-4}\times T) \times S \times G$, from the calculated thickness T (unit: μm) of the second region, the base area S (corresponding to the application area, unit: cm$^2$) of the container, and the specific gravity G (unit: g/cm$^3$) of the binder. The thickness of the binder is slightly increased due to the volume of the photocatalyst particles buried in the binder. Accordingly, the actual addition amount of the binder was adjusted to be slightly lower than the calculated addition amount of the binder to achieve the desired ratio T/L.

Production of Photocatalyst Layer (A-2)

Photocatalyst layer (A-2) was produced by the same method as that for photocatalyst layer (A-1) except that in the photocatalyst layer-forming process, the addition amount of the binder and the addition amount of the photocatalyst particles were changed such that the thickness T of the second region and the ratio T/L were those shown in Table 1.

Production of Photocatalyst Layer (A-3)

Photocatalyst layer (A-3) was produced by the same method as that for photocatalyst layer (A-1) except that in the secondary grinding process, photocatalyst particles passed through a sieve with an aperture of 4 mm and remained on a sieve with an aperture of 2 mm were obtained instead of photocatalyst particles passed through a sieve with an aperture of 63 μm. Consequently, the secondary particle diameter L of the photocatalyst particles was changed to the value shown in Table 1. In the photocatalyst layer-forming process, the addition amount of the binder and the addition amount of the photocatalyst particles were changed such that the thickness T of the second region and the ratio T/L were those shown in Table 1.

Production of Photocatalyst Layer (A-4)

Photocatalyst layer (A-4) was produced by the same method as that for photocatalyst layer (A-1) except that in the secondary grinding process, photocatalyst particles passed through a sieve with an aperture of 4 mm and remained on a sieve with an aperture of 2 mm were obtained instead of photocatalyst particles passed through a sieve with an aperture of 63 μm. Consequently, the secondary particle diameter L of the photocatalyst particles was changed to the value shown in Table 1. In the photocatalyst layer-forming process, the addition amount of the binder and the addition amount of the photocatalyst particles were changed such that the thickness T of the second region and the ratio T/L were those shown in Table 1.

Production of Photocatalyst Layer (A-5)

Photocatalyst layer (A-5) was produced by the same method as that for photocatalyst layer (A-1) except that in the photocatalyst layer-forming process, an acrylic resin ("Acrypet VH", manufactured by Mitsubishi Chemical Corporation) was used as the binder instead of the silicone resin ("KR-220LP", manufactured by Shin-Etsu Chemical Co., Ltd.). In the photocatalyst layer-forming process, the addition amount of the binder and the addition amount of the photocatalyst particles were changed such that the thickness T of the second region and the ratio T/L were those shown in Table 1.

Production of Photocatalyst Layer (A-10)

Photocatalyst layer (A-10) was produced by the same method as that for photocatalyst layer (A-1) except that in the secondary grinding process, photocatalyst particles passed through a sieve with an aperture of 2 mm and remained on a sieve with an aperture of 0.5 mm were obtained instead of photocatalyst particles passed through a sieve with an aperture of 63 μm. Consequently, the secondary particle diameter L of the photocatalyst particles was changed to the value shown in Table 2. In the photocatalyst layer-forming process, the addition amount of the binder and the addition amount of the photocatalyst particles were changed such that the thickness T of the second region and the ratio T/L were those shown in Table 2.

Production of Photocatalyst Layer (A-11)

Photocatalyst layer (A-11) was produced by the same method as that for photocatalyst layer (A-1) except that in the photocatalyst layer-forming process, a silane coupling agent ("KBP-90", manufactured by Shin-Etsu Chemical Co., Ltd.) was used as the binder instead of the silicone resin ("KR-220LP", manufactured by Shin-Etsu Chemical Co., Ltd.). In the photocatalyst layer-forming process, the paint was dried to form a condensation product of the silane coupling agent. In the photocatalyst layer-forming process, the addition amount of the binder and the addition amount of the photocatalyst particles were changed such that the thickness T of the second region and the ratio T/L were those shown in Table 2.

Production of Photocatalyst Layer (B-1)

Photocatalyst layer (B-1) was produced by the same method as that for photocatalyst layer (A-1) except that in the secondary grinding process, photocatalyst particles passed through a sieve with an aperture of 4 mm and remained on a sieve with an aperture of 2 mm were obtained instead of photocatalyst particles passed through a sieve with an aperture of 63 μm. Consequently, the secondary particle diameter L of the photocatalyst particles was changed to the value shown in Table 2. In the photocatalyst layer-forming process, the addition amount of the binder and the addition amount of the photocatalyst particles were changed such that the thickness T of the second region and the ratio T/L were those shown in Table 2.

Production of Photocatalyst Layer (B-2)

Photocatalyst layer (B-2) was produced by the same method as that for photocatalyst layer (A-1) except that in the secondary grinding process, photocatalyst particles passed through a sieve with an aperture of 4 mm and remained on a sieve with an aperture of 2 mm were obtained instead of photocatalyst particles passed through a sieve with an aperture of 63 μm. Consequently, the secondary particle diameter L of the photocatalyst particles was changed to the value shown in Table 2. In the photocatalyst layer-forming process, the addition amount of the binder and the addition amount of the photocatalyst particles were changed such that the thickness T of the second region and the ratio T/L were those shown in Table 2.

Production of Photocatalyst Layer (B-3)

Photocatalyst layer (B-3) was produced by the same method as that for photocatalyst layer (A-1) except that in the photocatalyst layer-forming process, the addition amount of the binder and the addition amount of the photocatalyst particles were changed such that the thickness T of the second region and the ratio T/L were those shown in Table 2.

Production of Photocatalyst Layer (B-4)

Photocatalyst layer (B-4) was produced by the same method as that for photocatalyst layer (A-1) except that in the photocatalyst layer-forming process, the addition amount of the binder and the addition amount of the photocatalyst particles were changed such that the thickness T of the second region and the ratio T/L were those shown in Table 2.

Production of Photocatalyst Layer (A-6)

Primary Grinding Process

Photocatalyst particles (tungsten oxide, specifically $WO_3$, manufactured by Kishida Chemical Co., Ltd., 135 g) and deionized water (1215 g) were subjected to primary grinding with a bead mill (media agitating wet ultrafine grinding and dispersing machine "MSC50", manufactured by Nippon Coke & Engineering Co., Ltd.) to prepare a photocatalyst particle dispersion. In the bead milling, beads having a diameter of 0.1 mm (manufactured by Nikkato Corporation) were used. The conditions for bead milling were a circumferential velocity of 10 m/sec and a treatment time of 360 minutes. The primary particle diameter of the photocatalyst particles contained in the dispersion after primary grinding was about 50 nm. The dispersion after primary grinding was used in the auxiliary catalyst-supporting process without being dried.

Auxiliary Catalyst-Supporting Process

Hydrogen hexachloroplatinate(IV) hexahydrate (manufactured by Kishida Chemical Co., Ltd., solid content concentration: 98.5%) was dissolved in the photocatalyst particle dispersion prepared in the primary grinding process. The addition amount of the hydrogen hexachloroplatinate (IV) hexahydrate was such that the content of elemental platinum in the photocatalyst particles was 0.025 mass %. Subsequently, the dispersion was heated at 100° C. to evaporate water. Consequently, agglomerates of the photocatalyst particles were prepared.

Secondary Grinding Process

The agglomerates of the photocatalyst particles prepared in the auxiliary catalyst-supporting process were ground with a mortar and pestle to obtain a ground product of the photocatalyst particles. The ground product of the photocatalyst particles was classified with a shaking sieve to obtain photocatalyst particles passed through a sieve with an aperture of 63 μm. Consequently, photocatalyst particles having a desired secondary particle diameter were prepared. The resulting photocatalyst particles had a secondary particle diameter L of 30 μm.

Photocatalyst Layer-Forming Process

A predetermined amount of a binder (silicone resin, "KR-220LP", manufactured by Shin-Etsu Chemical Co., Ltd.) was dissolved in a solvent (isopropyl alcohol) to prepare a binder solution. A predetermined amount of the photocatalyst particles prepared in the secondary grinding process and the whole amount of the binder solution were mixed to prepare a paint. The paint was poured into a container of which the base area was known and was dried at 50° C. After the solvent was sufficiently volatilized, heating at 85° C. was performed for 1 hour to completely volatilize the solvent. Consequently, photocatalyst layer (A-6) was prepared. The addition amount of the binder and the addition amount of the photocatalyst particles were adjusted such that the thickness T of the second region was 24 μm and the ratio T/L was 0.80. The addition amount of the binder and the addition amount of the photocatalyst particles were each determined according to the "Method for determining addition amount" described above.

Production of Photocatalyst Layer (A-7)

Photocatalyst layer (A-7) was produced by the same method as that for photocatalyst layer (A-6) except that in the auxiliary catalyst-supporting process, silver nitrate (manufactured by Kishida Chemical Co., Ltd.) was used instead of hydrogen hexachloroplatinate(IV) hexahydrate (manufactured by Kishida Chemical Co., Ltd., solid content concentration: 98.5%). The addition amount of silver nitrate was such that the content of elemental silver in the photocatalyst particles was 0.025 mass %.

Production of Photocatalyst Layer (A-8)

Photocatalyst layer (A-8) was produced by the same method as that for photocatalyst layer (A-6) except that in the auxiliary catalyst-supporting process, copper acetate (manufactured by Kishida Chemical Co., Ltd.) was used instead of hydrogen hexachloroplatinate(IV) hexahydrate (manufactured by Kishida Chemical Co., Ltd., solid content concentration: 98.5%). The addition amount of copper acetate was such that the content of elemental copper in the photocatalyst particles was 0.025 mass %.

Production of Photocatalyst Layer (A-9)

Primary Grinding Process

The primary grinding process of photocatalyst layer (A-9) was carried out by the same method as the primary grinding process in the production of photocatalyst layer (A-1).

Secondary Grinding Process

The agglomerates of the photocatalyst particles prepared in the auxiliary catalyst-supporting process were ground with a mortar and pestle to obtain a ground product of the photocatalyst particles. The ground product of the photocatalyst particles was classified with a shaking sieve to obtain photocatalyst particles passed through a sieve with an aperture of 4 mm and remained on a sieve with an aperture of 2 mm. Consequently, photocatalyst particles having a desired secondary particle diameter were prepared. The resulting photocatalyst particles had a secondary particle diameter L of 3000 μm.

Photocatalyst Layer-Forming Process

A predetermined amount of a binder (acrylic resin, "Acrypet VH", manufactured by Mitsubishi Chemical Corporation) was dissolved in a solvent (isopropyl alcohol) to prepare a binder solution. A predetermined amount of the photocatalyst particles prepared in the secondary grinding process and the whole amount of the binder solution were mixed to prepare a paint. The paint was poured into a container of which the base area was known and was dried at 50° C. After the solvent was sufficiently volatilized, heating at 85° C. was performed for 1 hour to completely volatilize the solvent. The addition amount (predetermined amount) of the binder and the addition amount (predetermined amount) of the photocatalyst particles were adjusted such that the thickness T of the second region was 2400 m and the ratio T/L was 0.80. The addition amount of the binder and the addition amount of the photocatalyst particles were each determined according to the "Method for determining addition amount" described above.

Subsequently, the dried paint was subjected plasma irradiation treatment as surface treatment. For details, the surface of the dried paint was irradiated with plasma (output: 200 W) for 30 minutes with a plasma radiator ("Plasma dry cleaner PDC210" available from Yamato Scientific Co., Ltd.). The binder in the paint was partially ground down by the plasma irradiation. The photocatalyst particles in the paint were not ground by the plasma irradiation. Photocatalyst layer (A-9) was formed by the plasma irradiation treatment. The thickness T of the second region of photocatalyst layer (A-9) was 2400 μm, and the ratio T/L was 0.80. The photocatalyst particles in photocatalyst layer (A-9) were not covered with the binder and protruded.

Production of Photocatalyst Layer (B-5)

Primary Grinding Process and Secondary Grinding Process

The primary grinding process and the secondary grinding process in the production of photocatalyst layer (B-5) were performed as in the primary grinding process and the secondary grinding process in the production of photocatalyst layer (A-1).

Photocatalyst Layer-Forming Process

A predetermined amount of a binder (silicone resin, "KR-220LP", manufactured by Shin-Etsu Chemical Co., Ltd.) was dissolved in a solvent (isopropyl alcohol) to prepare a binder solution. The binder solution was poured into a container of which the base area was known and was dried at 50° C. After the solvent was sufficiently volatilized, heating at 85° C. was performed for 1 hour to completely volatilize the solvent. The amount of the binder was adjusted such that the thickness T of the second region was 24 μm. Subsequently, a predetermined amount of the photocatalyst particles prepared in the secondary grinding process was dispersed in water to prepare a photocatalyst particle dispersion. The photocatalyst particle dispersion was spray-coated on the binder and was dried. Consequently, photocatalyst layer (B-5) was prepared. In photocatalyst layer (B-5), a binder layer was formed on the bottom of the container, and a photocatalyst layer was formed on the binder layer. The predetermined amount of the binder and the predetermined amount of the photocatalyst particles were determined according to the "Method for determining addition amount" described above.

Measuring Method

Method for Measuring Secondary Particle Diameter L

The secondary particle diameter L of the photocatalyst particles was measured with a laser diffraction/scattering particle size distribution analyzer ("Microtrac (registered trademark) MT3300 EXII", manufactured by MicrotracBEL Corp.). The measurement samples were prepared by the following method. The photocatalyst particles prepared in the secondary grinding process were dispersed in water to prepare a slurry. The slurry was diluted with water to the concentration specified by the measuring apparatus and was then sufficiently dispersed by ultrasonication to prepare a measurement sample.

Method for Measuring Thickness T

The photocatalyst layer was observed from the horizontal direction (direction perpendicular to the thickness direction D) with a field-emission scanning electron microscope ("S-4300SE", manufactured by Hitachi High-Technologies Corporation) at an observation magnification of 10000×, and an electron micrograph was taken. The thickness of the region (second region) where no photocatalyst particles were observed was measured by image processing of the photo. The thicknesses T at 10 points were measured. The sum of the measured thicknesses was divided by the number of the measurement points to obtain the number-average value of the thickness. The number-average value of the thickness was used as the thickness T of the second region.

Method for Verifying Contact Point, First Region, and Second Region

Photocatalyst layers were produced by the respective methods for producing photocatalyst layers (A-1) to (A-11) and (B-1) to (B-5) except that in the photocatalyst layer-forming process, the paint was poured into a container of which the base area was known and in which a transparent film was placed on the bottom. The transparent film on which a photocatalyst layer was formed was taken out from the container and was embedded in an epoxy resin. The embedded transparent film on which a photocatalyst layer was formed was cut with a diamond microtome to prepare a thin cross-section sample of the photocatalyst layer. The thin sample was observed with a field-emission scanning electron microscope ("S-4300SE", manufactured by Hitachi High-Technologies Corporation) at a magnification of 10000× whether the photocatalyst particles were in contact with the rear surface of the photocatalyst layer or not, that is, whether the photocatalyst particles had contact points with the rear surface of the photocatalyst layer or not. In addition, it was verified that the photocatalyst layer had a region (first region) containing the photocatalyst particles. Furthermore, it was verified that the photocatalyst layer had a region (second region) not containing the photocatalyst particles and containing only the binder.

Evaluation Method and Evaluation Results
Evaluation of Initial Photocatalytic Performance Photocatalyst layers (A-1) to (A-11) and (B-1) to (B-5) were evaluated for the initial photocatalytic performance. As the photocatalytic performance, the activity of decomposing acetaldehyde was evaluated. For details, a container accommodating a photocatalyst layer was placed in a 5-L gas bag. The gas bag was filled with acetaldehyde such that the acetaldehyde concentration in the gas bag was 100 ppm. Subsequently, the gas bag was irradiated with a white LED (illumination intensity: 10000 Lx) for 2 hours. The acetaldehyde concentration $C_1$ in the gas bag after the irradiation for 2 hours was measured with an acetaldehyde gas detector tube. The decreasing rate (unit: %) of acetaldehyde in the initial photocatalyst layer was calculated from the expression: decreasing rate=100×(100−$C_1$)/100.

Evaluation of Photocatalytic Performance after Endurance

Photocatalyst layers (A-1) to (A-11) and (B-1) to (B-5) were evaluated for the photocatalytic performance after endurance. For details, the surface of a photocatalyst layer was rubbed back and forth ten times with a rag. The photocatalyst layer after the rubbing was irradiated with a blue LED for 2 hours by the same method as that in the evaluation of initial photocatalytic performance, and the acetaldehyde concentration $C_2$ in the gas bag was then measured with an acetaldehyde gas detector tube. The decreasing rate (unit: %) of acetaldehyde in the photocatalyst layer after endurance was calculated from the expression: decreasing rate=100×(100−$C_2$)/100.

The initial and post-endurance photocatalytic performances were evaluated from the decreasing rate of acetaldehyde according to the following criteria. The results of evaluation are shown in Table 3.

Excellent: an acetaldehyde-decreasing rate of 50% or more;

Good: an acetaldehyde-decreasing rate of 20% or more and less than 50%;

Poor: an acetaldehyde-decreasing rate of 5% or more and less than 20%; and

Bad: an acetaldehyde-decreasing rate of less than 5%.

Evaluation of Suppression of Detachment

Photocatalyst layers (A-1) to (A-11) and (B-1) to (B-5) were evaluated for whether detachment of the photocatalyst particles was suppressed or not (adhesion force of photocatalyst particles). The bottom of the glass container used in the formation of each photocatalyst layer corresponds to the substrate. The surface of the photocatalyst layer was rubbed back and forth ten times with a rag. Whether the photocatalyst particles were detached or not was visually verified.

Whether detachment of the photocatalyst particles was suppressed or not was evaluated according to the following criteria. The results of evaluation are shown in Table 3.

Good: no detachment of photocatalyst particles was observed; and

Poor: detachment of photocatalyst particles was observed.

TABLE 3

| | Photocatalyst layer | Detachment suppression | Photocatalytic performance | |
|---|---|---|---|---|
| | | | Initial | After endurance |
| Example 1 | A-1 | Good | Good | Good |
| Example 2 | A-2 | Good | Good | Good |
| Example 3 | A-3 | Good | Good | Good |
| Example 4 | A-4 | Good | Good | Good |
| Example 5 | A-5 | Good | Good | Good |
| Example 6 | A-6 | Good | Good | Good |
| Example 7 | A-7 | Good | Good | Good |
| Example 8 | A-8 | Good | Good | Good |
| Example 9 | A-9 | Good | Excellent | Excellent |
| Example 10 | A-10 | Good | Good | Good |
| Example 11 | A-11 | Good | Good | Good |
| Comparative Example 1 | B-1 | Poor | Good | Poor |
| Comparative Example 2 | B-2 | Good | Bad | Bad |
| Comparative Example 3 | B-3 | Poor | Good | Poor |
| Comparative Example 4 | B-4 | Good | Bad | Bad |
| Comparative Example 5 | B-5 | Poor | Good | Bad |

As shown in Tables 1 and 2, photocatalyst layers (A-1) to (A-11) each had a front surface and a rear surface (for details, the surface being in contact with the container) on the opposite side of the front surface. The photocatalyst layer contained photocatalyst particles and a binder. The photocatalyst layer had a first region containing the photocatalyst particles and a second region containing the binder and not containing the photocatalyst particles. The photocatalyst particles included tungsten oxide particles. The photocatalyst particle had a contact point being in contact with the rear surface. The ratio of the thickness T of the second region to the secondary particle diameter L of the photocatalyst particles, T/L, was 0.20 or more and 0.80 or less. Consequently, as shown in Table 3, in each of photocatalyst layers (A-1) to (A-11), the detachment suppression was evaluated as Good. In addition, in each of photocatalyst layers (A-1) to (A-11), the initial photocatalytic performance and the photocatalytic performance after endurance were evaluated as Excellent or Good.

In contrast, as shown in Table 2, in each of photocatalyst layers (B-1) and (B-3), the ratio T/L was less than 0.20. Consequently, as shown in Table 3, in each of photocatalyst layers (B-1) and (B-3), the detachment suppression was evaluated as Poor. In addition, in each of photocatalyst layers (B-1) and (B-3), the photocatalytic performance after endurance was evaluated as Poor.

As shown in Table 2, in each of photocatalyst layers (B-2) and (B-4), the ratio T/L was higher than 0.80. Consequently, as shown in Table 3, in each of photocatalyst layers (B-2) and (B-4), the initial photocatalytic performance and the photocatalytic performance after endurance were evaluated as Bad.

As shown in Table 2, in photocatalyst layer (B-5), the photocatalyst particle did not have a contact point being in contact with the rear surface of the photocatalyst layer. Consequently, as shown in Table 3, in photocatalyst layer (B-5), the detachment suppression was evaluated as Poor. In addition, in photocatalyst layer (B-5), the photocatalytic performance after endurance was evaluated as Bad.

From the above, it was demonstrated that photocatalyst layers (A-1) to (A-11) encompassed in the present disclosure can be improved in the photocatalytic performance, while suppressing the detachment of photocatalyst particles, compared to photocatalyst layers (B-1) to (B-5). In addition, it was demonstrated that a photocatalyst including the photocatalyst layer of the present disclosure and a photocatalyst manufactured by the method of the present disclosure can be improved in the photocatalytic performance while suppressing the detachment of photocatalyst particles.

The photocatalyst layer of the present disclosure, the photocatalyst of the present disclosure, and the photocatalyst manufactured by the method of the present disclosure can be used in photocatalytic performance products, such as building materials, automotive interior materials, home appliances, and textile products.

The present disclosure contains subject matter related to that disclosed in Japanese Priority Patent Application JP 2018-085364 filed in the Japan Patent Office on Apr. 26, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A photocatalyst layer having a front surface and a rear surface on the opposite side of the front surface,
   the photocatalyst layer comprising:
   photocatalyst particles; and
   a binder,
   the photocatalyst layer having:
   a first region containing the photocatalyst particles; and
   a second region containing the binder and not containing the photocatalyst particles, wherein
   the photocatalyst particles include tungsten oxide particles;
   the photocatalyst particles have contact points being in contact with the rear surface;
   a thickness T of the second region of the photocatalyst layer is 6 μm or more and 2400 μm or less, the thickness T of the second region is calculated by a number-average value of the thickness of the second region,
   ratio T/L of thickness T of the second region to number-average secondary particle diameter L of the photocatalyst particles is 0.20 or more and 0.80 or less, and
   the thickness T of the second region is shown the number-average value of the thickness, wherein
   each of the photocatalyst particles has an exposed region.

2. The photocatalyst layer according to claim 1, wherein the number-average secondary particle diameter L of the photocatalyst particles is 30 μm or more and 3000 μm or less.

3. The photocatalyst layer according to claim 1, wherein
   the tungsten oxide particles support auxiliary catalyst particles; and
   the auxiliary catalyst particles include platinum particles, silver particles, or copper particles.

4. The photocatalyst layer according to claim 1, wherein the binder includes a silicone resin, an acrylic resin, or a condensation product of a silane coupling agent.

5. The photocatalyst layer according to claim 1, wherein
   the front surface of the photocatalyst layer is an uneven surface; and
   the photocatalyst particles have exposed regions, the exposed regions protruding without being covered with the binder and constituting at least part of a convex surface of the front surface of the photocatalyst layer.

6. A photocatalyst comprising:
   a substrate; and
   a photocatalyst layer provided on the substrate, wherein the photocatalyst layer is the photocatalyst layer according to claim 1.

* * * * *